United States Patent [19]
Beadles et al.

[11] Patent Number: 5,648,789
[45] Date of Patent: Jul. 15, 1997

[54] METHOD AND APPARATUS FOR CLOSED CAPTIONING AT A PERFORMANCE

[75] Inventors: Robert L. Beadles, Durham, N.C.; John E. D. Ball, Vienna, Va.

[73] Assignee: National Captioning Institute, Inc., Vienna, Va.

[21] Appl. No.: 769,849

[22] Filed: Oct. 2, 1991

[51] Int. Cl.⁶ ................................................. G08G 3/02
[52] U.S. Cl. .............................. 345/8; 353/122; 359/630
[58] Field of Search ................................. 340/705, 980; 351/50, 47, 41–46; 345/8, 9, 7; 359/630, 631, 632, 13; 348/56; 353/122

[56] References Cited

U.S. PATENT DOCUMENTS

| | | | |
|---|---|---|---|
| 3,337,992 | 8/1967 | Tolson | 49/29 |
| 3,936,605 | 2/1976 | Upton | 351/50 |
| 4,275,385 | 6/1981 | White | 340/312 |
| 4,292,474 | 9/1981 | Morrell et al. | 179/99 M |
| 4,317,232 | 2/1982 | Pickett | 455/606 |
| 4,317,233 | 2/1982 | Kunde et al. | 455/606 |
| 4,317,234 | 2/1982 | Kunde et al. | 455/606 |
| 4,414,431 | 11/1983 | McCartney | 351/47 |
| 4,456,793 | 6/1984 | Baker et al. | 379/60 |
| 4,562,463 | 12/1985 | Lipton | 358/88 |
| 4,627,092 | 12/1986 | New | 351/50 |
| 4,633,498 | 12/1986 | Wernke et al. | 381/25 |
| 4,636,866 | 1/1987 | Hattori | 340/705 |
| 4,673,266 | 6/1987 | Fiumi | 352/90 |
| 4,735,514 | 4/1988 | Kubik | 384/44 |
| 4,757,714 | 7/1988 | Purdy et al. | 73/597 |
| 4,806,011 | 2/1989 | Bettinger | 351/47 |
| 4,859,994 | 8/1989 | Zola et al. | 340/705 |
| 4,870,486 | 9/1989 | Nakagawa et al. | 359/56 |
| 4,902,083 | 2/1990 | Wells | 359/214 |
| 4,907,860 | 3/1990 | Noble | 351/41 |
| 4,934,773 | 6/1990 | Becker | 340/755 |
| 5,162,828 | 11/1992 | Furness et al. | 340/353 |
| 5,224,198 | 6/1993 | Jachimowicz et al. | 385/133 |

FOREIGN PATENT DOCUMENTS

| | | |
|---|---|---|
| 653197 | 12/1985 | Switzerland . |
| 2165679 | 4/1986 | United Kingdom . |
| WO88/02494 | 4/1988 | WIPO . |

OTHER PUBLICATIONS

"A head–mounted three dimensional display", Fall Joint Computer Conference, 1968 Ivan E. Sutherland, pp. 757–763.

Sales Brochure from Virtual Vision.

*Primary Examiner*—Kee M. Tung
*Assistant Examiner*—Doon Chow
*Attorney, Agent, or Firm*—Banner & Witcoff, Ltd.

[57] ABSTRACT

Apparatus for providing closed captioning at a performance comprises means for encoding a signal representing the written equivalent of spoken dialogue. The signal is synchronized with the spoken dialog and transmitted to wearable glasses of a person watching the performance. The glasses include receiving and decoding circuits and means for projecting a display image into the field of view of the person watching the performance representing at least one line of captioning. The field of view of the displayed image is equivalent to the field of view of the performance. A related method for providing closed captioning further includes the step of accommodating for different interpupillary distances of the person wearing the glasses.

53 Claims, 7 Drawing Sheets

2 = OBJECT  1 = IMAGE

FIG. 9
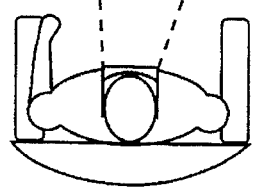

METHOD AND APPARATUS FOR CLOSED CAPTIONING AT A PERFORMANCE

BACKGROUND OF THE INVENTION

The present invention relates to a display method and apparatus for producing an image in the field of view of a person wherein the viewed image represents the written equivalent of the spoken dialogue, for example, in a film in a cinema or accompanying a live performance in a theater.

A problem facing deaf or hard of hearing people is that reading of written material accompanying a performance is not efficient unless the field of view of the display is equivalent to the field of view of the performance watched. Furthermore, the field of view of the display must be sufficiently large to show at least one line containing several words. Reading efficiency for deaf or hard of hearing people improves if two or three such lines are provided by the display. Reading efficiency is important because it is essential that the user of the display be able to read fast enough to easily keep up with the dialogue of the film or the live performance, while at the same time view the performance, and thereby suitably enjoy the experience.

Many situations exist in which it is desirable to present information to an individual by superimposing an image onto her/his normal field of vision. In addition to the so-called heads up displays now used in many aircraft, three patents describe basic techniques for wearable displays which superimpose an image with the intent of improving lipreading of speech information. Two patents to Upton U.S. Pat. Nos. 3,463,885 ('885) and 3,936,605 ('605) disclose a display which is mounted upon a pair of spectacles intended to be worn by a deaf or hard of hearing person. In Upton ('885), entitled SPEECH AND SOUND DISPLAY SYSTEM, a number of miniature light bulbs are mounted on a lens of the spectacles, and each bulb is associated with a class of speech sounds. A bulb is activated in response to the detection of a speech sound in a given class. In one embodiment, a single bulb is activated in response to the detection of a given class. In another embodiment, sounds which represent combinations of sound classes activate more than one bulb, and in a third embodiment, separate bulbs are activated to denote combinations.

In Upton ('605), entitled EYEGLASS MOUNTED VISUAL DISPLAY, a device is described wherein the source of the image is a light emitting diode (LED) mounted on the eyeglass frame at the side of the eye of the wearer and out of his normal field of view. A small, generally spherical mirror is mounted on the eyeglass lens and is of appropriate focal length to project a virtual, in-focus image into the field of view of the wearer.

Another patent, McCartney, U.S. Pat. No. 4,414,431, entitled METHOD AND APPARATUS FOR DISPLAYING SPEECH INFORMATION, describes an alternate method for displaying speech information as an aid to lipreading. In McCartney, a wearable heads up display with a large aperture spherical mirror is used as a magnifier for a light emitting diode display and as a beam combined to superimpose the magnified image on the normal field of view of the wearer. A magnified virtual image of visual symbols representing speech information is produced approximately one meter away from the viewer and can be centered about the speaker's face to allow simultaneous viewing of the speaker's lips and the symbols. The display achieves high symbol brightness while consuming little electrical power by using a large spherical mirror made from glass with a high index of refraction. The ability to place small LED multisegment displays close to the eye-mirror optical axis results in an optical system which both is simple and does not interfere significantly with normal vision.

In Baker et al., U.S. Pat. No. 4,456,793, there is disclosed an infrared telecommunications system in which a building is equipped with infrared transceivers. In similar arrangement, a theater, movie house, stadium, or other location of a performance may be equipped with suitably mounted transmission apparatus for infrared transmission to a pair of infrared receiving glasses worn by a deaf or hard of hearing person.

SUMMARY OF THE INVENTION

It is an object of the subject invention to provide, primarily for deaf or hard of hearing people, the equivalent in the cinema for theater of closed captions that have become widely available on television to deaf, hard of hearing and selected other audiences. It is proper to note that the ready availability of TV closed captions both for live TV and for videotapes of movies represents the emancipation of the deaf or hard of hearing community with respect to the medium of television. A further object of the subject invention is then to enable the emancipation of the deaf or hard of hearing community with respect to the cinema, live theater and other performances including sporting events or other live entertainment.

A theater or cinema is an ideal environment for infrared transmission of communications signals. Sunlight has a very high infrared content and, consequently, infrared transmission is extremely difficult outdoors in daylight without use of such devices as infrared lasers or directional broadcast mirrors to boost infrared signal strength. To the contrary, a theater or cinema is generally designed to be impregnable to sunlight and low power infrared transmission can be used to great success. Thus, according to one principle of the present invention, infrared transmission of captioning for deaf or hard of hearing people is ideally suited for a theater environment, while radio frequency, high frequency sound, or other forms of wireless transmission are more aptly suited, for example, for use at a ballpark or outdoor stadium.

In contrast to Upton ('605) and to McCartney, whose LED displays comprise one and two seven-segment characters respectively, it is a further principle of the present invention that a wearable caption display must be able to display on the order of 30 characters per line, equivalent to five or six typical words, and preferably display more than one line. Another essential feature of the present invention is that the character images for the caption display can be much smaller than those in Upton ('605) and in McCartney. The Upton ('605) display blocks the visual field of the wearer over that portion of the eyeglass lens mounting the spherical mirror. The McCartney display magnifies the LED displays by approximately 100 times, and the horizontal angle subtended by the image of an LED display is about three degrees of visual field. The image size of a character for the caption display must be much smaller than Upton ('605) and McCartney and in accordance with the present invention is such as to enable a visual field of about 30 characters per line to be seen.

It is known that the minimum visual angle of a character to be read should be in the range of 0.2 to 0.4 degrees for comfortable viewing over time, which places a lower limit on the character size for the caption display. This characteristic is discussed in detail in the article "Psychophysics of Reading. I. Normal Vision", in *Vision Research*, 25:239–252, (1985) by Legge, G. E., D. G. Pelli, and G. S. Rubin, incorporated herein by reference. If 0.3 decrees is selected for the character size, then ten characters for the caption display of the present invention would subtend the same three degrees as one LED device in McCartney, and a total caption display field of view of ten degrees would allow 33 characters to be seen. To a reasonable approximation, then, the caption display could be built with an optical design very similar to McCartney if suitable LED displays could be obtained which are only one-tenth as large as those used in McCartney. This display, however, would produce an image one meter in front of the wearer, and the caption display must produce its image much further away, in the range of five to twenty-five meters. Choosing a distance of ten meters (about 33 feet), the caption display would require LED displays with characters which are 1/100 the size of those used in McCartney if the same object distance were used. Such small displays are well beyond the state of the LED art.

The caption display requires alphanumeric capability, hence the LEDs used for it must be of the sixteen-segment type or the dot matrix type, or be a scanning-type display. The caption display must be capable of producing well-formed upper and lower case letters and limited special symbols. The sixteen-segment display does not have sufficient versatility to produce both upper and lower case fonts, but it is less expensive than the dot matrix type of LED display which can produce both upper and lower case. The dot matrix type is available in red, yellow, and green, with the red being less expensive than the other two.

In summary, the present invention is a unique caption display device with the following characteristics:

uses light emitting diode technology for display of alphanumeric characters:

uses a wireless link, preferably infrared, to receive captions from caption producing equipment;

displays alphanumeric characters on two to three lines, each of which can hold up to about 30 such characters;

causes minimal interference with the normal vision of the wearer;

is comfortable to wear for a few hours at a time;

consumes little electrical power, for long battery life; accommodates for different interpupillary distances;

accommodates for eye dominancy; and has display magnification and brightness suitable for use in cinemas and theaters.

Other objects and purposes of the invention will be clear from the following detailed description of the drawings.

BRIEF DESCRIPTION OF THE DRAWINGS

FIG. 9 is a view looking down from above showing how a typical two-line message appears when superimposed on the field of view of the wearer.

DETAILED DESCRIPTION OF THE PREFERRED EMBODIMENTS

The present invention incorporates the following four basic elements, each of which will be discussed in detail below:

(1) optical elements which magnify the display elements and superimpose display images on the visual field of the wearer;

(2) display elements, preferably LED arrays;

(3) receiving and decoding elements which send an alphanumeric message to display elements at the correct time;

(4) transmitting and synchronizing elements, preferably wireless, which synchronize, encode, and transmit electrical, acoustical, or optical signals representing an alphanumeric message, preferably the dialogue in a movie synchronized to the sound track or its equivalent.

Optical Elements

Two basic optical principles are discussed below as background for the present invention. First, a positive lens positioned between the eye and an object (e.g., the LED array) can produce a magnified virtual image of the object, and the amount of magnification can be controlled from unity to infinity by changing the distance from the lens to the object. Second, a beamsplitter positioned between the eye and a distant image, for example, a theater can superimpose the magnified virtual image of the object on the visual field to produce a single composite, in-focus image.

Figure 1:
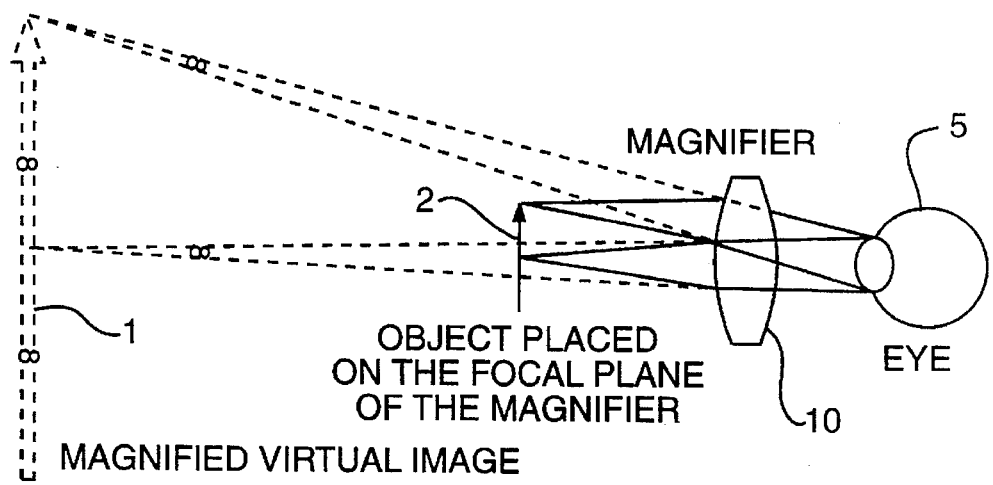
FIG. 1 shows how a virtual image is produced.

FIG. 1 illustrates schematically how a virtual image is produced. In the figure, a virtual image 1 is shown at infinity, which is produced when the object 2 is exactly in the focal plane of lens 10, i.e., when the distance from the lens to the object is exactly equal to the focal length of the lens. For this condition, the magnification is infinitely large and obviously not a useful value. High useful magnification values are obtained, however, when the object is placed at a distance which is less than but very nearly equal to the focal length of the lens. This behavior is easily observed by looking through any positive lens, such as an ordinary magnifying glass, and observing what happens as the distance from the lens to an object (e.g., printed letters) is slowly increased. The magnification increases and the field of view decreases as the lens is moved away, until at the focal distance, the image disappears as the field of view becomes vanishingly small.

Figure 2:
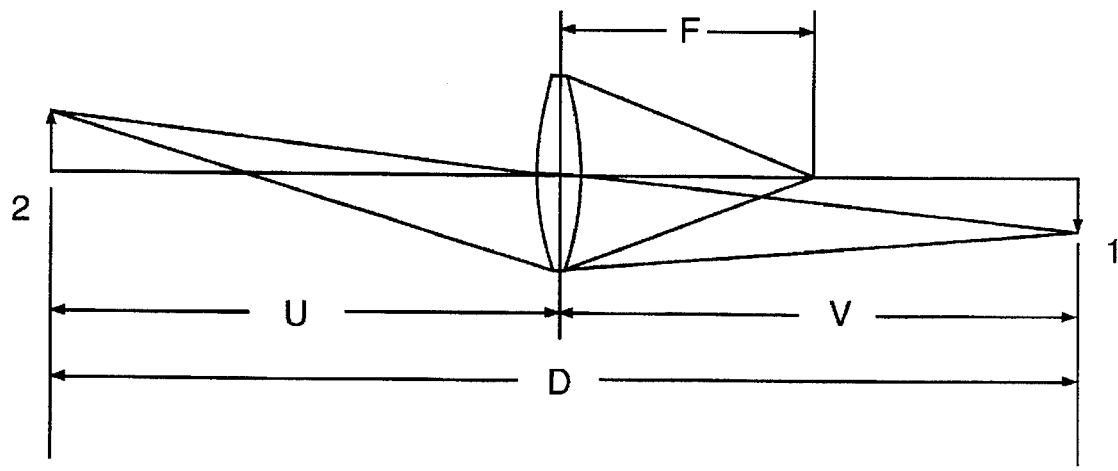
FIG. 2 shows the naming conventions associated with object, image, and image-producing lens, which appear in basic optical formulas.

Two optical formulas are necessary to define the optical system. Referring to FIG. 2, they are:

1) the magnification M of the system is the ratio of (the distance V from lens 10 to image 1) to (the distance U from lens 10 to object 2), $M=V/U$.

2) independently of the image and object distances from the lens, a single relationship always holds between the lens focal length F and the image and object distances, $1/F=1/U+1/V$.

Figure 3:
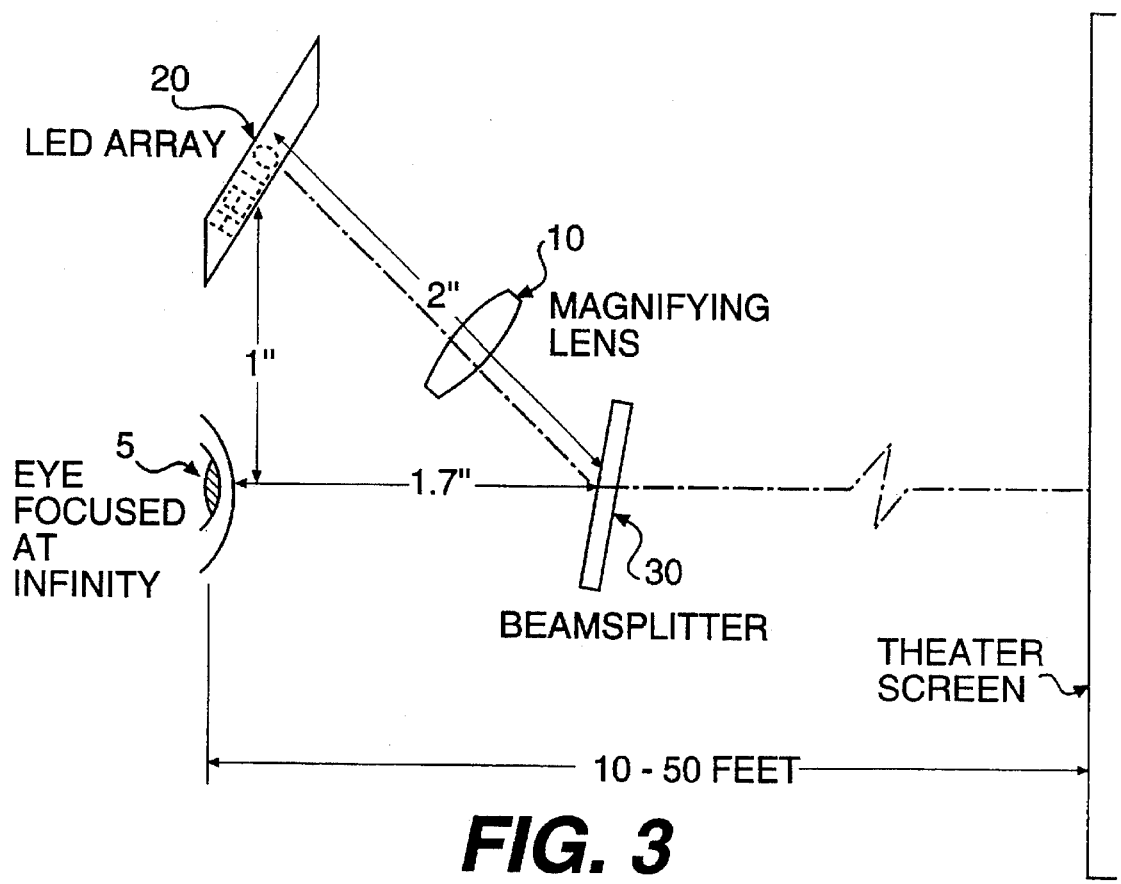
FIG. 3 shows an optical arrangement for the preferred embodiment of the wearable display device.

The preferred embodiment for the optical design for the present invention is shown in FIG. 3. Here, the LED array 20 is positioned essentially against the forehead with its long (row) dimension horizontal. The vertical distance from the center of eye 5 to the center of LED array 20 is shown on the figure as one inch; the actual distance will depend upon the ultimate size of the array and its effects on the size and focal length of magnifying lens 10. From inspection of FIG. 3, it might appear that the magnifying lens as shown would block the wearer's line of sight. We note that this need not be true because of the aspect ratio of display 20 is long and narrow. Thus, magnifying lens 10 is preferably not round but a relatively narrow slice cut from the center of a spherical lens, with its major dimension aligned to the major dimension of LED array 20.

In a second embodiment of the optical design, not illustrated here, the row dimension of LED array 20 is positioned perpendicular to the forehead of the wearer and just above or just below the height of eye 5. Lens 10 is positioned in front of array 20 at a distance to magnify it suitably, and the resulting virtual image is relayed to eye 5 by a beamsplitter-performing a function similar to beamsplitter 30 but positioned at a nominally 45 degree angle to lens 10 and to eye 5.

The two previous optical design formulas given were used to produce the data shown in Table 1 below.

TABLE 1

| LENS FOCAL LENGTHS, MAGNIFICATIONS, IMAGE AND OBJECT DISTANCES | | | |
|---|---|---|---|
| FOCAL LENGTH mm (in) | OBJECT DISTANCE mm (in) | MAGNIFICATION | IMAGE DISTANCE meters (feet) |
| 25 (0.98) | 24.5 (0.96) | 50 | 1.2 (4.0) |
| 25 (0.98) | 24.8 (.097) | 100 | 2.4 (8.0) |
| 37.5 (1.48) | 36.7 (1.45) | 50 | 1.8 (6.0) |
| 37.5 (1.48) | 37.1 (1.46) | 100 | 3.6 (12.0) |
| 50 (1.97) | 49.0 (1.93) | 50 | 2.4 (8.0) |
| 50 (1.97) | 49.5 (1.95) | 100 | 4.8 (16.0) |

Figure 4:
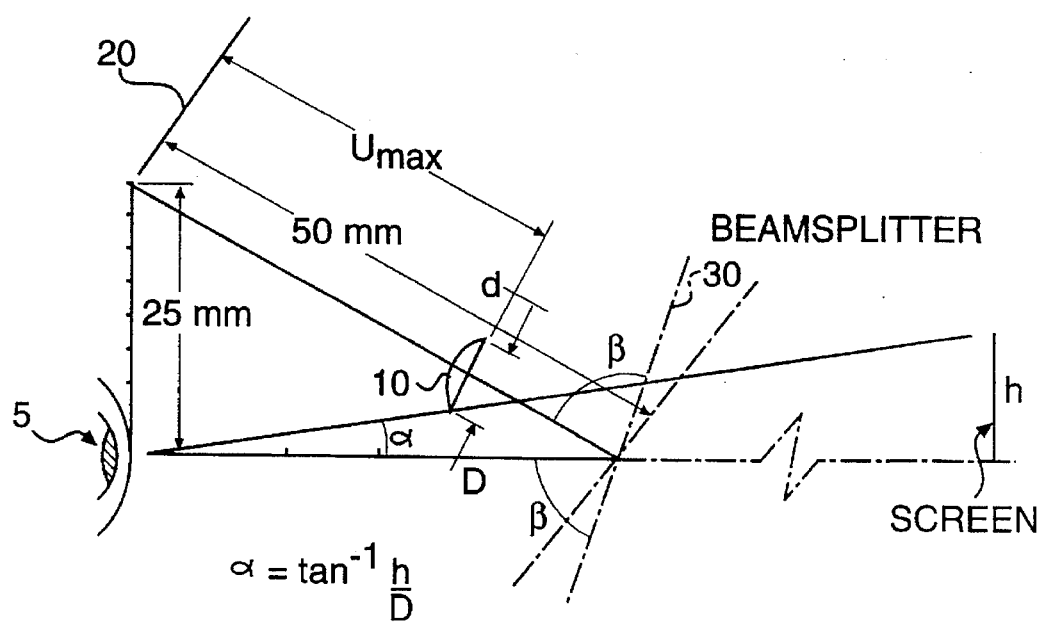
FIG. 4 shows an expanded view of FIG. 3 with angles and dimensions.

With reference to these data and FIGS. 3 and 4, a lens having focal length of 25 mm (0.98 in) positioned 24.8 mm (0.97 in) away from the array will magnify each character by 100 times and place its image 100 times further away, about 8 feet. Doubling the lens focal length while keeping the magnification at 100 times would move the image twice as far away, about 16 feet and sufficiently far away to allow comfortable viewing in most theaters. Lens 10 incorporates a focus adjustment to allow the magnification to be changed and the image moved closer or further away, both for the convenience of the wearer and to allow for correcting vision defects if for any reason she/he chooses not to wear corrective lenses. A light level control is incorporated for LED array 20 to adjust display brightness for comfortable viewing of captions in varying light levels. We note that for the dimensions shown in FIG. 3, the longest focal length lens that would be practical without its interfering with the vision of the wearer is about 30 mm (1.18 in).

The previously discussed McCartney patent, incorporated herein by reference, shows a wearable heads-up display with a large aperture spherical mirror used as a magnifier for a light emitting diode display and as a beam combiner to superimpose the magnified image on the normal field of view of the wearer. If 0.3 degrees is selected for the character size of the present invention, then ten characters for caption display 20 would subtend the same three degrees as 1 LED device for the McCartney display, and a total caption display field of view of ten degrees would allow 33 characters to be seen.

Table 2 below shows design parameters for a wearable caption display. Its total magnification is preferably in the range of 50 to 100 times to reduce the manufacturing cost and improve the ease of use of the display. The purposes of the table are to illustrate the preferred range of character size and magnification, to explore their effects on the physical dimensions of a caption display, and to translate these requirements into the dimensional and packaging requirements on the LED array whose characteristics set the design requirements for the rest of the apparatus.

TABLE 2

| SOME DESIGN PARAMETERS FOR WEARABLE CAPTION DISPLAYS | | | | | |
|---|---|---|---|---|---|
| CHAR. CHAR. HT. AND SPACING MM (IN) | 32-CHAR. LINE WIDTH MM (IN) | MAGNIFICATION | IMAGE DIST., METERS (FEET) | VISUAL FIELD DEG. | CHAR HT. AS VIEWED MM (IN) |
| 1.40 (0.055) | 44.8 (1.76) | 50 | 10 (32.8) | 0.4 | 70 (2.75) |
| 0.70 (0.028) | 22.4 (0.88) | 100 | 10 (32.8) | 0.4 | 70 (2.75) |
| 0.70 (0.028) | 22.4 (0.88) | 50 | 5 (16.4) | 0.4 | 35 (1.38) |
| 0.35 (0.014) | 11.2 (0.44) | 100 | 5 (16.4) | 0.4 | 35 (1.38) |
| 0.70 (0,028) | 22.4 (0.88) | 50 | 10 (32.8) | 0.2 | 35 (1.38) |
| 0.35 (0.014) | 11.2 (0.44) | 100 | 10 (32.8) | 0.2 | 35 (1.38) |
| 0.35 (0.014) | 11.2 (0.44) | 50 | 5 (16.4) | 0.2 | 17.5 (0.79) |
| 0.17 (0.007) | 5.5 (0.22) | 100 | 5 (16.4) | 0.2 | 17.5 (0.79) |

Column 1 gives the height and center-to-center spacing of the individual LED characters before any magnification. Column 2 gives the total width of a row of 32 characters of the specified size. This is the minimum physical size in the row dimension of the caption display. For example, the width given in row 1 is 44.8 mm (1.76 in). This is probably too big to represent a practical dimension for a wearable display. One conclusion is that LED characters that are 1.4 mm high and spaced 1.4 mm apart are too large for the present device. Column 3 gives the magnification of the display, Column 4 is the assumed image distance. This is how far in front of the wearer the images of the magnified LED characters will appear. The two different image distances shown are 10 meters and 5 meters. It should be noted that for images as simple as alphanumeric characters, there will be almost no noticeable loss of image clarity (focus) at 10 meters for a display which is designed to produce its image at 5 meters, i.e., focus at 5 meters is a reasonable approximation to "focus at infinity". Column 5 gives the visual angle in degrees of one character as seen by the wearer and after magnification. Column 6 gives the image height of a character as viewed.

As an example, one may compare the values in Table 2 with the captions that are produced on a typical TV set. Consider a 25-inch set used for viewing captions. The horizontal width of the screen is approximately 20 inches. Assume the maximum length of a line of captions on the screen is ¾ of the screen width, or 16 inches. Thirty-two characters displayed over 16 inches are about ½ inch wide each. If the TV is viewed from a distance of ten feet, the visual angle alpha represented by one character is:

$$\text{alpha} = \tan^{-1} (0.5 \text{ in}/120 \text{ in}) = 0.23 \text{ degrees.}$$

If viewed from a distance of five feet, the visual angle of a single caption character is twice as great, about 0.46 degrees. Thus, the typical captions on television are about the same size in terms of visual angle as those which would be produced by a wearable caption display producing characters in the range of 0.2 degrees to 0.4 degrees of visual angle.

Since three rows of LED characters in array 20 are preferred, the lower limit on the height dimension is roughly one-tenth that of the row dimension shown in column 2. Thus the display height is small in comparison to its width and does not represent a significant constraint.

Display Elements

The two types of LED displays that are capable of producing alphanumerics are the sixteen-segment type and the dot matrix type. Both types are well known to those with ordinary skill in the art. A sixteen-segment type display is described in detail in *Catalog of Optoelectronic Products* 1985, General Instruments Optoelectronics Division (now Quality Technologies Corp.), Sunnyvale, Calif., page 286, incorporated herein by reference. Because the sixteen-segment display needs far fewer input-output lines for fully accessing it, it can be miniaturized to a significantly greater degree than can the dot matrix display for the same state of the LED art.

By contrast, the LED dot matrix display when housed in a package with a similar number of pins as a sixteen-segment type with the same number of characters will contain a large amount of support circuitry to reduce the pin count and to simplify the electronic circuitry necessary to access and control the display. A representative dot matrix display is described in detail in *Optoelectronics Designers Catalog* 1988–1989, Hewlett-Packard Corp., Palo Alto, Calif. 94303, page 7–20, incorporated herein by reference. Hewlett-Packard manufactures a 5×7 dot matrix display packaged in 1 row×4 characters, 1 row×8 characters and 2 rows×8 characters in its HCMS-2700 product line. The size of the displays are still too large to be effectively used in the present invention, and the largest package available is only 2 rows×8 characters. Nevertheless, the HCMS-2720 LED dot matrix display shows a good example of this type of display. The package for this is a "Smart Display" where extensive internal logic (implemented in silicon ICs) makes it easy to use and easy to interface to microprocessors.

To reduce the number of input-output pins on the package, the fabrication of the LED array for the caption display will require that at least some of its support circuitry be packaged in the same enclosure as the array itself. For example, if the full 32 character by 3 line caption display preferred in the present invention were built with sixteen-segment monolithic characters and no support circuitry, the pin count of the package would be approximately three times the total number of characters, or 288 pins, an untenably complex package.

The cost of manufacturing of sixteen-segment displays is lower than for dot matrix displays of the same size because the semiconductor material used to fabricate green, yellow, and orange LEDs is optically transparent, and the LED emits light from below the surface of the substrate. The light is scattered so much that character definition is inadequate unless the individual LEDs are electrically isolated from each other. The extremely small size of the LEDs needed for the present invention means that batch fabrication without the need for scribing the semiconductor wafer into individual LED chips and later reassembling into dot matrix characters favors red LED arrays. However, the preferred LED array for the present invention is the dot matrix type for two reasons. First, the dot matrix display can produce a much larger character set (well-formed letters in upper and lower case plus special characters) while the sixteen-segment display is presently restricted to upper case letters only plus a limited number of special characters. Second, the sixteen-segment display is only available in red, while the colors available for the dot matrix display include those colors preferred from human factors and visual perception viewpoints.

Figure 5:
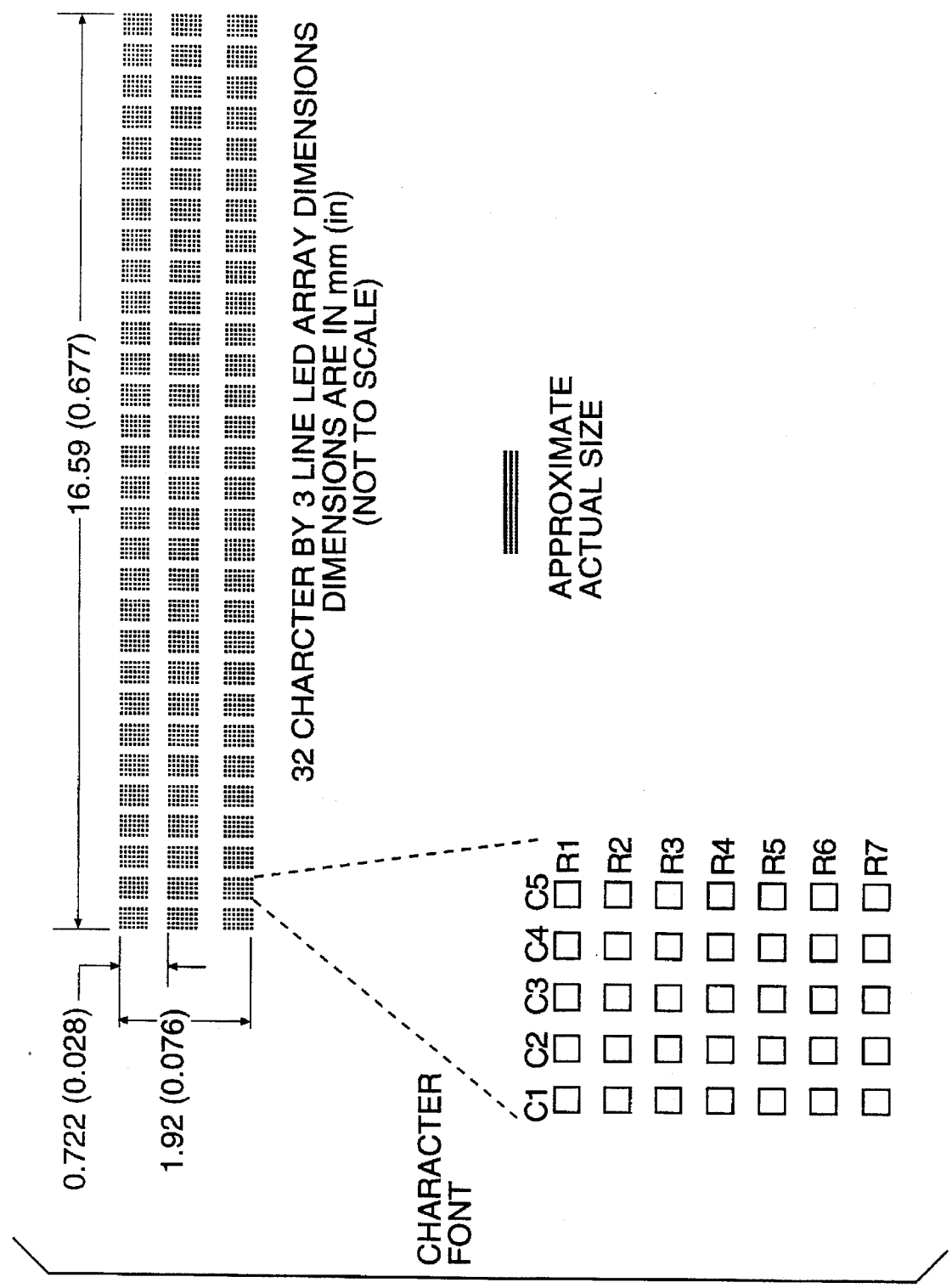
FIG. 5 illustrates the preferred form of the LED array for the present invention and indicates its approximate size before magnification.

FIG. 5 shows a dot matrix LED array in the preferred 32 character by 3 row form. The approximate actual size of the preferred array is shown in the figure. This is the preferred display element for the present invention.

Receiving and Decoding Elements

Figure 6:
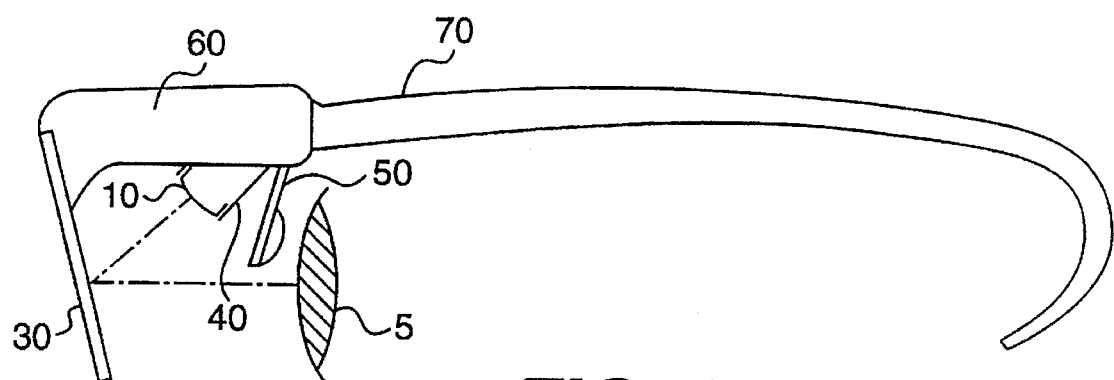
FIG. 6 shows a side view of the wearable display device comprising the receiver, the decoder, and the optical display of the present invention.
Figure 7:
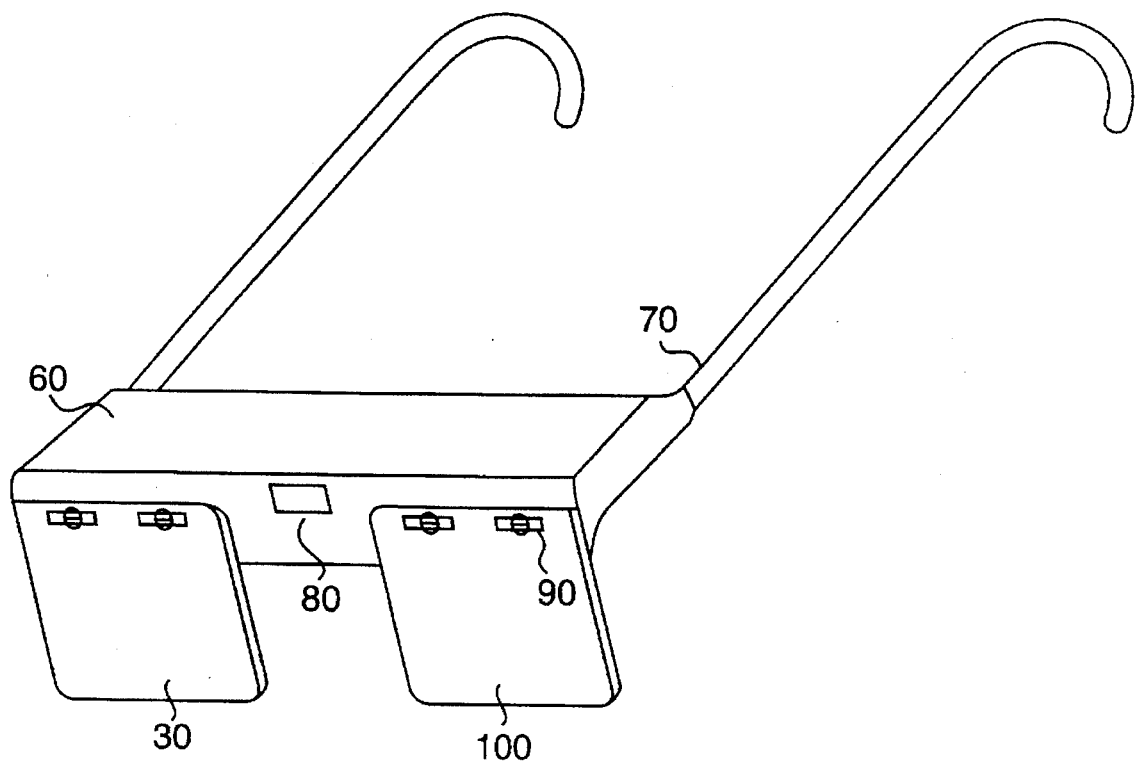
FIG. 7 shows a front view of said wearable display device.
Figure 8:
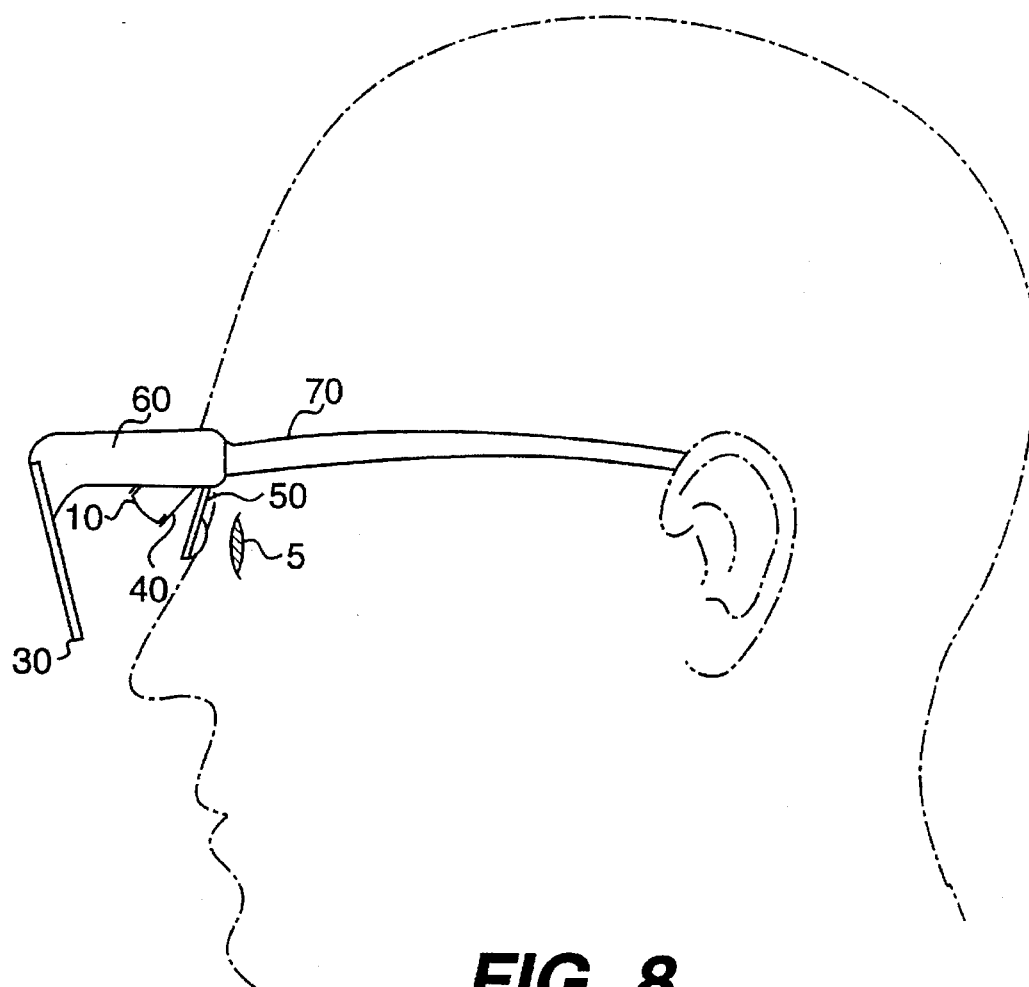
FIG. 8 shows a side view of the wearable display device as worn.

By way of introduction to the details of the electronics incorporated in the wearable display, FIGS. 6, 7, and 8 illustrate its general physical configuration. The display is incorporated into a spectacle-like arrangement. The electronics are packaged in housing 60 attached by hinges to temple pieces 70. Magnifying lens 10 is mounted in focusing housing 40. FIG. 7 illustrates a preferred mounting means for beamsplitter 30, in which slotted holes 90 are provided to enable easy adjustment of the unit for differing interpupillary distances of different wearers. Alternatively, a different width housing 60 can accomplish the same object. In the normal arrangement, the LED display 20 is magnified by lens 10 and presented to the dominant eye of the wearer. FIG. 7 shows a unit for a right-eye dominant person, and beamsplitter 100 does not receive an image from the LED array but is provided to match the scene intensity for both eyes. A unit for a left-eye dominant person would have beamsplitters 30 and 100 reversed and the magnified image of the LED array would be delivered to the left eye. Adjustable nosepiece 50 is provided to enable moving the optical axis of the unit up or down to align the LED image to suit the wearer. Optical window 80 is provided to transmit infrared light while blocking most of the light of shorter wavelength to improve the signal to noise ratio of the received infrared-encoded captions. Although not shown in FIGS. 6 and 8, a second optical window may optionally be located on the side of housing 60 over optional second infrared receiver to improve the omnidirectional reception of the infrared-encoded captions.

FIG. 8 shows the general arrangement of the wearable display as worn, and FIG. 9 is a view looking down from above showing how a typical two-line message appears when superimposed on the field of view of the wearer.

Figure 10:
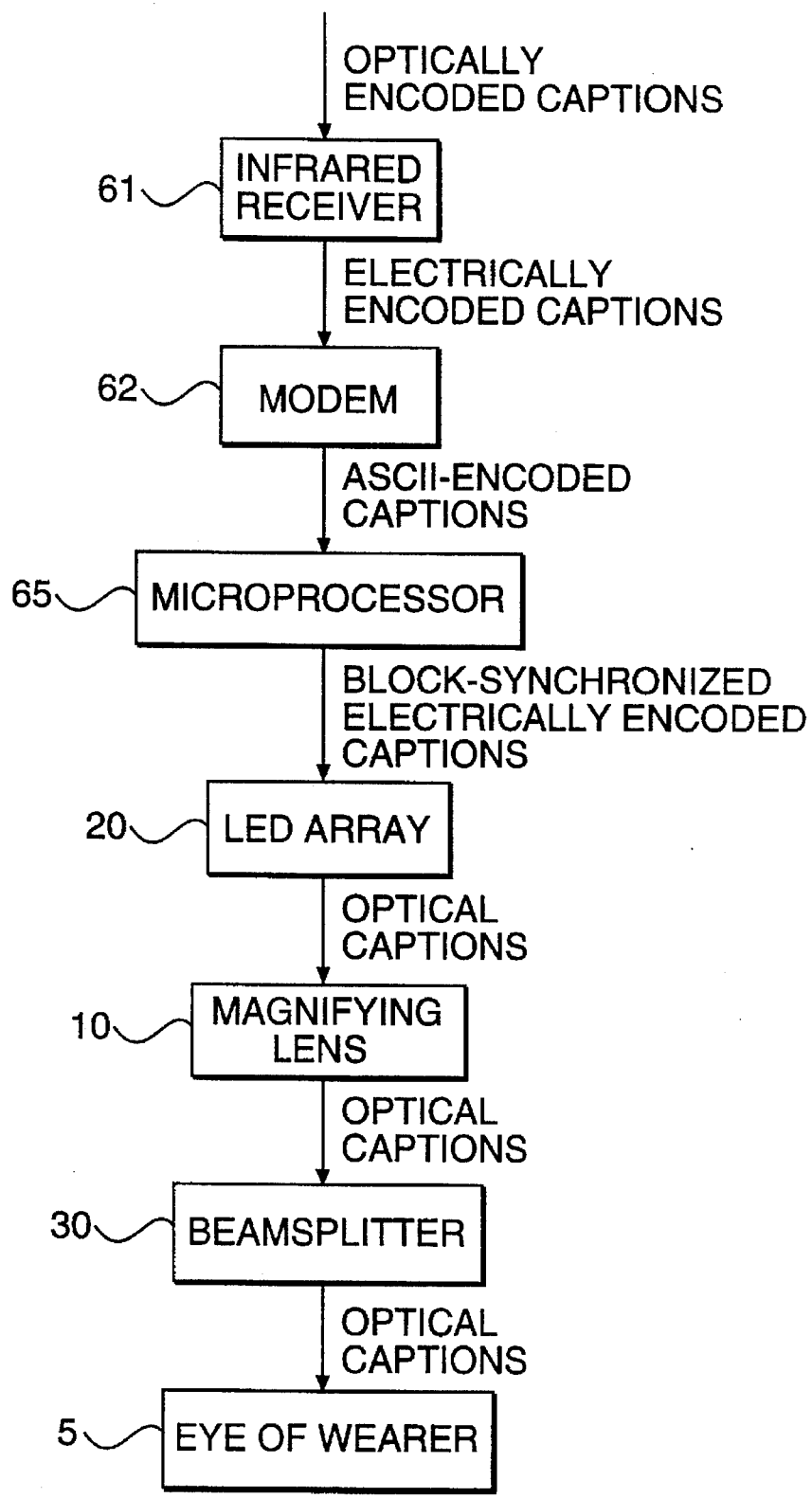
FIG. 10 shows a block diagram of the electronics and optics associated with the wearable display.

Turning now to FIG. 10 which shows the major functions of the wearable display, infrared receiver 61 receives the optically encoded captions, converts them into electrical signals, and passes them to modulator-demodulator (modem) 62. Microprocessor 65 receives a block of characters representing one caption from modem 62, transfers them to LED array 20 with the proper control and related signals to cause it to display the caption at the proper time, then waits until the receipt of either a clear-screen code or the receipt of a new block of characters representing the next caption. The caption is presented to the wearer from LED array 20 via lens 10 and beamsplitter 30 to eye 5.

The present eyeglasses may be further adapted to comprise a microphone, a suitable voice encoder, and an infrared transmitter in a manner suggested by Baker et al., U.S. Pat. No. 4,456,793, to provide a two way communications capability. Deaf or hard of hearing people who are not speech impaired would receive textual messages projected via the eye glasses into their field of view and transmit voice messages via the microphone through a two way communications or telecommunications link. Thus, the present invention lays the foundation for a portable telephone for deaf or hard of hearing people.

In place of a microphone, a miniature keyboard, coupled to the eye glasses may be associated with microprocessor 65 for two way communications by a deaf or hard of hearing person who is also speech impaired. The microprocessor in known manner encodes the keyboard entered textual message of the person for transmission and receipt by known communications or telecommunications apparatus for deaf or hard of hearing people.

Transmitting and Synchronizing Elements

Figure 11:
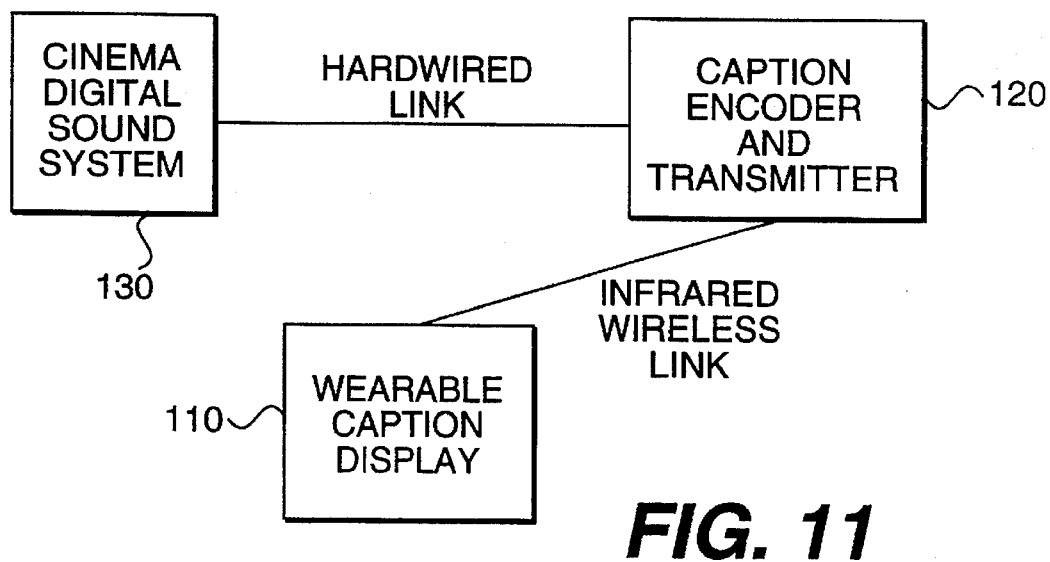
FIG. 11 shows a block diagram of the display system comprising the transmitter, the wireless link, and the wearable display which includes receiver, decoder, LED array, and optical elements.

The transmitting and synchronizing elements synchronize, encode, and transmit electrical, acoustical, or optical, preferably infrared in a theater or cinema environment, signals representing an alphanumeric message, preferably the dialogue in a movie synchronized to the sound track or its equivalent. The preferred encoding method for caption encoder and transmitter 120 (FIG. 11) is to convert the sound-track-synchronized captions received from cinema digital sound system 130 to audio tones using one of the standard methods employed in modems. These methods are well know to those with ordinary skill in the art and are discussed in detail in "The Theory and Practice of Modem Design," John Wiley and Sons (1988), by John A. C. Bingham, incorporated herein by reference. All other factors being equal, the use of a lower baud rate for the encoding modem will reduce the electrical power requirement for decoding modem 62. The preferred baud rate is in the range of 1200 to 2400, representing character rates in the range of 120 to 240 ASCII characters per second. Speaking rates seldom exceed 200 words per minute. An average written word in a caption representing the spoken word will be about 5 ASCII characters, producing a worst-ease requirement of 1000 characters per minute or about 17 characters per second. Since even at 1200 baud the channel capacity of the modem is about 7 times the worst-ease requirement for the captions, the wearable display design is easily implemented with low voltage microprocessors and associated circuits because timing margins can be generous and total power consumption kept low given the present state of the microprocessor art. Synchronization of the captions to the movie sound track is performed by encoder/transmitter 120, and each caption is sent to modem 62 in block-synchronous or equivalent form, reducing microprocessor 65 synchronization requirements. The preferred link between transmitter 120 and wearable display is wireless, and, as already indicated, the preferred form of wireless is infrared.

Any references above to US patents should be deemed to incorporate by reference any subject matter disclosed therein considered essential to one of ordinary skill in the art to manufacture, use or sell the present invention. Many changes and modifications in the abovedescribed embodiment of the invention can, of course, be made without departing from the scope of the invention. Consequently, the scope is intended to be limited only by the following claims.

We claim:

1. An apparatus for providing a display of a sequence of alphanumeric characters in the field of view of a person, said person comprising a member of an audience, said apparatus comprising:

means for encoding a signal for transmission representing the written equivalent of spoken dialogue;

means for synchronizing said signal to the spoken dialogue;

circuit means for transmitting the encoded signal representing the written equivalent of the spoken dialogue;

circuit means for receiving and decoding the encoded signal representing the written equivalent of the spoken dialogue; and means for projecting a display image into said field of view to indicate at least one line of alphanumeric characters, said line of sufficient length to represent at least several words, wherein said encoding means, said synchronizing means, and said circuit means for transmitting are at a location other than the location of said person, and wherein said circuit means for receiving and decoding, and said projecting means, are at the location of said person and are adapted to be worn by said person.

2. An apparatus as in claim 1, in which the field of view of the person is equivalent to that of a performance the person is watching.

3. An apparatus as in claim 2, further comprising a means for varying said field of view of said person immediately prior to display of the at least one line of characters.

4. An apparatus as in claim 2, in which said circuit means for encoding and decoding said signal additionally comprises a modulator/demodulator.

5. An apparatus as in claim 1, in which the field of view is predetermined.

6. An apparatus as in claim 1, in which the field of view is between 15 and 35 feet.

7. An apparatus as in claim 1, in which the signal is electrical.

8. An apparatus as in claim 1, in which the signal is acoustic.

9. An apparatus as in claim 1, in which the signal is optical.

10. An apparatus as in claim 1, in which said circuit means for transmitting, receiving, and decoding said signal comprises a wireless link between transmitter and receiver.

11. An apparatus as in claim 10, in which said wireless link includes an infrared transmitter and an infrared receiver.

12. An apparatus as in claim 1, the apparatus being responsive to a signal representing a sound-track-synchronized caption, the encoding means and the transmitting means for encoding and transmitting an encoded caption to a location of the person, and the image projection means being adapted to be worn by the person.

13. An apparatus as in claim 1, the image projection means being portable and adapted to be worn by the user, the encoding and transmitting means being stationary.

14. An apparatus as in claim 1, the encoding means, the synchronizing means and the transmission circuit means being stationary, the receiving and decoding circuit means and the image projection means being adapted to be worn by the user.

15. An apparatus as in claim 14, the encoded signal being infrared and further comprising an infrared wireless link between the stationary means and the means adapted to be worn by the user.

16. An apparatus as in claim 1, wherein the written equivalent of spoken dialog comprises captions of alphanumeric characters.

17. An apparatus as in claim 1, wherein the receiving and decoding means comprises processor means for generating display control signals, the control signals comprising signals for timing a display of the at least one line of alphanumeric characters and clearing the display, the image projection means comprising means for timing and clearing the display responsive to the control signals.

18. An apparatus as in claim 1, wherein the image projection means comprises light display elements and optical elements which magnify light output of the light display elements and superimpose displayed output in the field of view of the person.

19. An apparatus as in claim 18, wherein the image projection means further comprises a beamsplitter for directing light output from the optical elements into the field of view of the person.

20. An apparatus as in claim 19, wherein the beamsplitter is adapted to direct the light output into a line of sight of the person watching a performance.

21. An apparatus as in claim 1, further comprising a beamsplitter adapted to receive and display said projected display image to permit said person to view a performance through said apparatus.

22. A wearable apparatus for providing a display of a sequence of alphanumeric characters, primarily words, in the field of view of a person comprising:
 circuit means for receiving and decoding an encoded signal representing said sequence of alphanumeric characters;
 means for synchronizing said received and decoded signal;
 means for projecting a display image corresponding to said synchronized signal into said field of view to indicate at least one line of alphanumeric characters, said line of sufficient length to represent at least several words; and
 means for adapting the wearable apparatus to accommodate different interpupillary distances of different persons.

23. A wearable apparatus as in claim 22, in which the field of view of the person is equivalent to that of a performance the person is watching.

24. A wearable apparatus as in claim 22, in which said circuit means for receiving and decoding said signal comprises a wireless link between transmitter and receiver.

25. A wearable apparatus as in claim 24, in which said wireless link comprises an infrared receiver.

26. A wearable apparatus as in claim 22, in which said circuit means for decoding said message comprises a demodulator.

27. A wearable apparatus as in claim 22 further comprising mounting means for mounting an optical magnifier having a focus mechanism.

28. A wearable apparatus as in claim 27, the mounting means comprising means for accommodating for different interpupillary distances of the person.

29. A wearable apparatus as in claim 22, the projecting means further comprising beamsplitting means adapted for eye dominancy of the person.

30. A wearable apparatus as in claim 22 comprising a microprocessor for controlling the apparatus.

31. A wearable apparatus as in claim 22, further comprising a surface adapted to receive and display said projected display image and adapted to permit said person to view a performance through said surface.

32. A method for providing a display of a sequence of alphanumeric characters, primarily words, in the field of view of a person comprising the steps of:
 encoding a signal representing the written equivalent of spoken dialogue;
 transmitting the encoded message representing the written equivalent of the spoken dialogue synchronized to said dialogue;
 receiving and decoding the encoded message representing the written equivalent of the spoken dialogue;
 projecting a focusable display image into said field of view to indicate at least one line of alphanumeric characters corresponding to said written equivalent of the spoken dialogue; and
 accommodating for different interpupillary distances of the person.

33. A method as in claim 32, in which said steps of transmitting, receiving, and decoding said message is performed by means of a wireless link between transmitter and receiver.

34. A method as in claim 33, in which said wireless link includes an infrared transmitter and an infrared receiver.

35. A method as in claim 32, in which the steps of encoding and decoding said message are performed by a modulator/demodulator.

36. A method as in claim 32, in which receipt, decoding, and delivery of the at least one line of alphanumeric characters are under the control of a microprocessor.

37. A method as in claim 32, wherein said image projecting step projects said focusable display image onto a surface through which said person can view a performance occurring beyond said apparatus.

38. An apparatus adapted to be worn by a person for providing a display of a sequence of alphanumeric characters in words forming a caption in the field of view of the person comprising:
 a receiver for receiving an optically encoded caption transmitted to the receiver over an infrared transmission link and outputting an electrically encoded caption;
 a modulator/demodulator for receiving the electrically encoded caption and outputting a caption encoded according to a format for encoding alphanumeric characters of the caption, a processor for synchronizing the format encoded caption into blocks of characters of sufficient length to represent at least several words, the processor further outputting control signals comprising signals for timing and clearing the display of the sequence of alphanumeric characters;

an LED array responsive to the caption blocks for displaying the caption blocks, a magnifying lens for focussing the displayed caption block optically to a beamsplitter, and the beamsplitter for presenting the caption block in the field of view of at least one eye of the person and into a line of sight of the person from at least one eye of the person to a performance when the person is wearing the apparatus and watching the performance.

39. An apparatus as in claim 38, wherein said beamsplitter permits said user to watch said performance through said apparatus.

40. A wearable apparatus for projecting a sequence of words into the field of view of a person in an audience, comprising:

circuit means for receiving and decoding a signal containing a sequence of at least several words, said signal transmitted from a transmitter located at a location other than the location of the person, said circuit means located at the location of the person;

projecting means, responsive to said circuit means, for projecting a display image of said sequence into said field of view, said display image comprising at least two lines of approximately 30 characters each, said projecting means including means for displaying uppercase, lowercase, and limited special symbols; and a beamsplitter positioned to receive and reflect said projected display image to said person, and adapted to permit said person to substantially see through said beamsplitter while said person is viewing said projected display image, wherein said projecting means includes a positive lens and said beamsplitter comprises a partially reflective planar mirror which substantially covers said person's field of view.

41. An apparatus as in claim 40, wherein said positive lens has a magnification factor greater than 50.

42. An apparatus as in claim 40, wherein said positive lens is positioned a distance of less than 50 mm from said planar mirror, and an optical axis of said positive lens forms an angle of less than 10 degrees with a plane orthogonal to said planar mirror.

43. An apparatus as in claim 40, wherein said beamsplitter and said positive lens are disposed such that an optical axis of said positive lens and an optical axis of an eye of said person intersect in the approximate center of said beamsplitter.

44. An apparatus as in claim 40, wherein said positive lens is movably displaceable in relation to said beamsplitter to adjust the position of said projected display image on said beamsplitter.

45. An apparatus as in claim 40, wherein said sequence of words comprises a plurality of characters, each character being projected to said person with a minimum visual field of 0.2 degrees.

46. An apparatus as in claim 40, wherein said beamsplitter comprises a first surface and a second surface, said first surface being partially reflective and said second surface having a shape which corrects for visual defects of said person.

47. An apparatus as in claim 40, further comprising a focusing means for focusing said projected display image.

48. An apparatus as in claim 40, wherein said circuit means comprises means for clearing and timing said projected display image of said sequence.

49. An apparatus as in claim 40, further comprising means for adjusting a brightness level of said projected display image.

50. The apparatus of claim 40, wherein the projecting means comprises a dot matrix LED display having three or more separate rows of characters.

51. The apparatus of claim 50, wherein the positive lens comprises a narrow slice cut from the center of a spherical lens, with its major dimension aligned with the major dimension of the dot matrix LED display.

52. The apparatus of claim 40, wherein each of said characters is projected to said person with a visual field of between 0.2 and 0.4 degrees.

53. A wearable apparatus for projecting a sequence of words into the field of view of a person comprising:

circuit means for receiving and decoding a signal containing a sequence of at least several words;

projecting means, responsive to said circuit means, for projecting a display image of said sequence into said field of view, wherein said projecting means includes a positive lens and a display element; and a beamsplitter positioned to receive and reflect said projected display image to said person, and adapted to permit said person to substantially see through said beamsplitter while said person is viewing said projected display image, wherein said beamsplitter comprises a partially reflective planar mirror;

wherein said positive lens is movably displaceable in relation to said beamsplitter to adjust the position of said projected display image on said beamsplitter; and wherein the positive lens comprises a narrow slice cut from the center of a spherical lens, with its major dimension aligned with the major dimension of the display element.

* * * * *